(12) United States Patent
Wu

(10) Patent No.: US 8,459,879 B2
(45) Date of Patent: Jun. 11, 2013

(54) OPTICAL FIBER CONNECTOR

(75) Inventor: Kun-Chan Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 294 days.

(21) Appl. No.: 12/975,221

(22) Filed: Dec. 21, 2010

(65) Prior Publication Data
US 2011/0255833 A1    Oct. 20, 2011

(30) Foreign Application Priority Data
Apr. 14, 2010 (TW) ................................ 99111525 A

(51) Int. Cl.
G02B 6/36 (2006.01)
G02B 6/32 (2006.01)

(52) U.S. Cl.
USPC .................................. 385/74; 385/33; 385/52

(58) Field of Classification Search
USPC ........................................................ 385/74
See application file for complete search history.

(56) References Cited

U.S. PATENT DOCUMENTS

| | | | | |
|---|---|---|---|---|
| 5,230,030 A | * | 7/1993 | Hartman et al. | 385/50 |
| 5,359,686 A | * | 10/1994 | Galloway et al. | 385/49 |
| 6,821,027 B2 | * | 11/2004 | Lee et al. | 385/89 |
| 7,108,432 B2 | * | 9/2006 | Nagasaka | 385/89 |
| 7,246,949 B2 | * | 7/2007 | Thiele et al. | 385/54 |
| 7,510,337 B2 | * | 3/2009 | Takeda et al. | 385/88 |
| 8,277,129 B2 | * | 10/2012 | Sabano et al. | 385/83 |
| 2003/0142909 A1 | * | 7/2003 | Suzuki et al. | 385/33 |
| 2004/0202417 A1 | * | 10/2004 | Watanabe et al. | 385/33 |
| 2004/0202477 A1 | * | 10/2004 | Nagasaka et al. | 398/138 |
| 2006/0104576 A1 | * | 5/2006 | Nagasaka | 385/93 |
| 2006/0245694 A1 | * | 11/2006 | Chen et al. | 385/71 |
| 2008/0008426 A1 | * | 1/2008 | Nagasaka | 385/92 |
| 2010/0215312 A1 | * | 8/2010 | Daikuhara et al. | 385/14 |
| 2011/0064358 A1 | * | 3/2011 | Nishimura | 385/33 |
| 2011/0150400 A1 | * | 6/2011 | Nishimura et al. | 385/83 |

FOREIGN PATENT DOCUMENTS

| | | | |
|---|---|---|---|
| JP | 04324406 A | * | 11/1992 |
| JP | 09090162 A | * | 4/1997 |
| JP | 2007163969 A | * | 6/2007 |

* cited by examiner

*Primary Examiner* — Michelle R Connelly
(74) *Attorney, Agent, or Firm* — Altis Law Group, Inc.

(57) ABSTRACT

An optical fiber connector includes an optical fiber, a body and an optical fiber receiving block. The body includes a top surface, a bottom surface, a front surface, and a rear surface. The top surface and the bottom surface extend from the front surface to the rear surface. The body defines a receiving groove in the rear surface. The body includes a lens portion arranged at the front surface. The optical fiber receiving block is attached on the body in the receiving groove. The optical fiber receiving block defines a through hole therein. The through hole receives the optical fiber. The lens portion is optically coupled with the optical fiber.

10 Claims, 3 Drawing Sheets

OPTICAL FIBER CONNECTOR

BACKGROUND

1. Technical Field

The present disclosure relates to optical fiber connectors.

2. Description of Related Art

Optical fiber connectors typically include a lens and a blind hole behind the lens. The blind hole receives an optical fiber. The lens receives and guides light from the optical fiber. The alignment accuracy between the blind hole and the lens is very important to the optical transmission ability of the optical fiber connectors.

Injection molding is a current molding process for molding the optical fiber connectors. A mold used in the injection molding process includes a core pin used to mold the blind hole. During the injection molding process, the core pin must be kept still to make sure the molded blind hole coincides with the design.

However, a distal end of the core pin in the mold cavity is easily bent under the impact of the molding material during the molding process. This deteriorates optical performance of the molded optical fiber connector.

Therefore, an optical fiber connector, which can overcome the limitations described, is needed.

DETAILED DESCRIPTION

Figure 1:
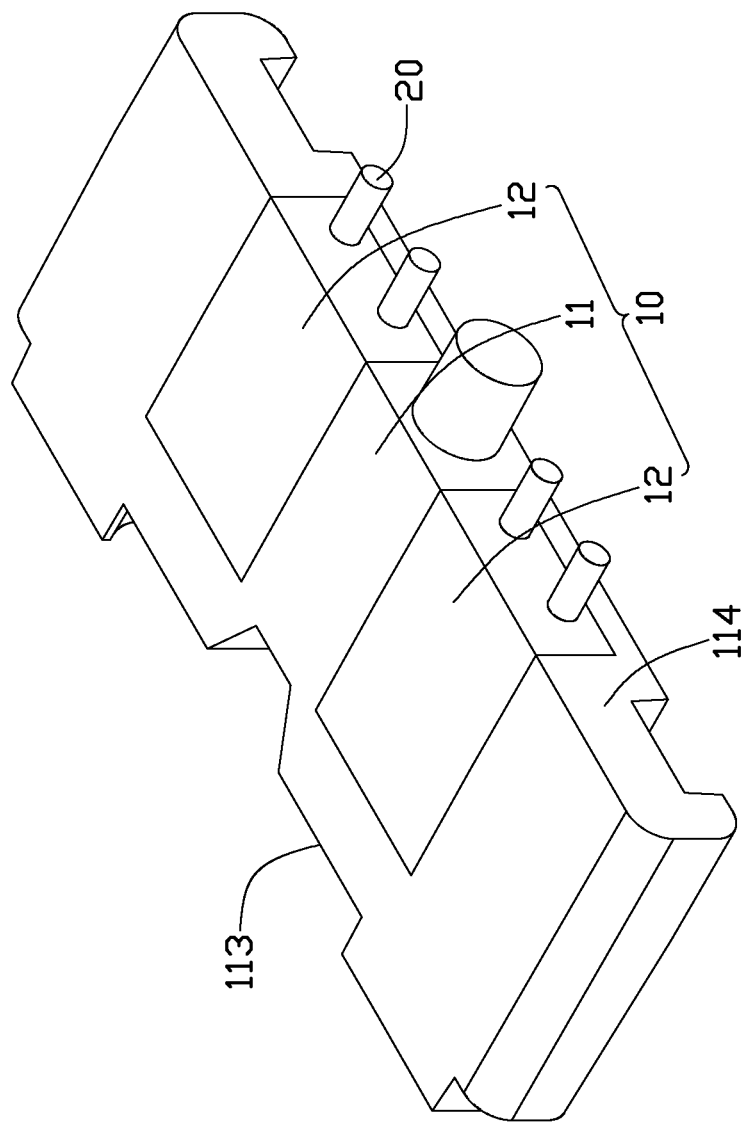
FIG. 1 is a schematic and isometric view of an optical fiber connector, according to an exemplary embodiment.
Figure 2:
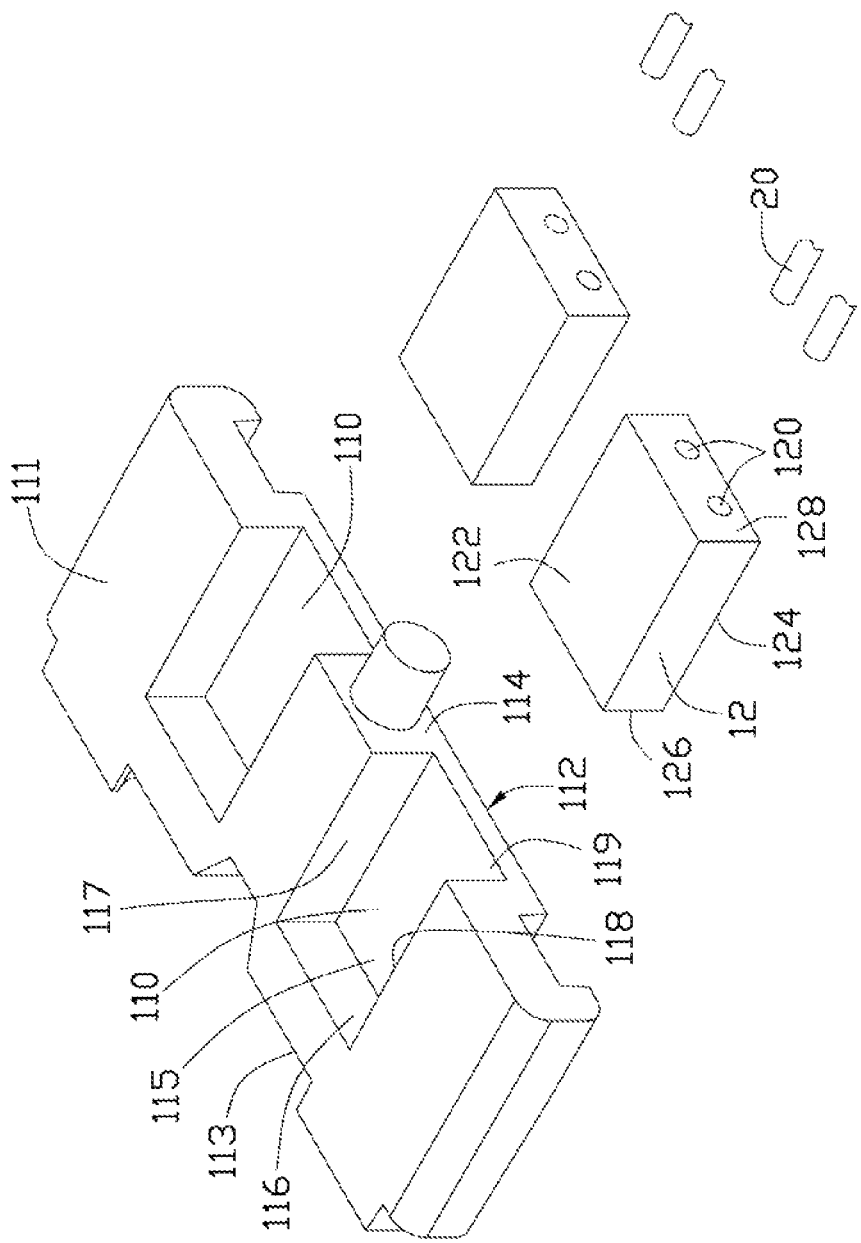
FIG. 2 is an exploded view of the optical fiber connector of FIG. 1.
Figure 3:
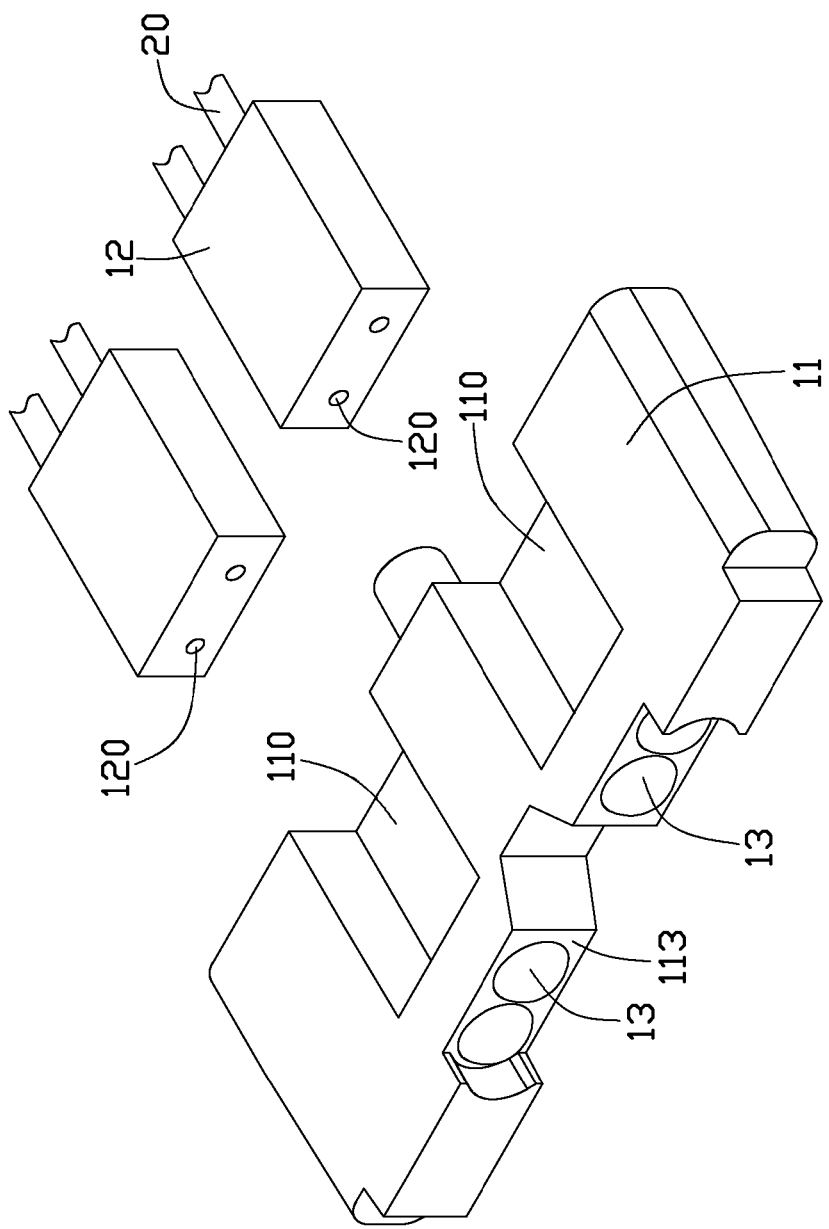
FIG. 3 is similar to FIG. 2, but viewed from another angle.

Referring to FIGS. 1 to 3, an optical fiber connector 10, according to an exemplary embodiment, includes a body 11, two optical fiber receiving blocks 12, and four optical fibers 20.

The body 11 includes a top surface 111, a bottom surface 112, a front surface 113, and a rear surface 114. The top surface 111, the rear surface 114, the bottom surface 112, and the front surface 113 are connected end-to-end in that order. The top surface 111 is opposite to the bottom surface 112. The front surface 113 is opposite to the rear surface 114. The top surface 111 and the bottom surface 112 extend from the front surface 113 to the rear surface 114. The body 11 includes four lens portions 13 arranged at the front surface 113.

Two receiving grooves 110 are defined in the rear surface 114. Each of the receiving grooves 110 is shaped to match a corresponding optical fiber receiving block 12. Each optical fiber receiving block 12 is attached on the body 11 in the corresponding receiving groove 110 with glue. The receiving grooves 110 are exposed at the top surface 111 and at the rear surface 114. Each of the receiving grooves 110 consists of a bottom surface 115, a first inner side surface 116, a second inner side surface 117, a third inner side surface 118, and an open end 119 at the rear surface 114. The first inner side surface 116, the second inner side surface 117, and the third inner side surface 118 extend from the bottom surface 115. The second inner side surface 117 is opposite to the third inner side surface 118. The first inner side surface 116 is interconnected between the second inner side surface 117 and the third inner side surface 118, and faces the open end 119.

A material of each optical fiber receiving block 12 is different from that of the body 11. The optical fiber receiving block 12 is transparent for ultraviolet light so that the glue can be cured by the ultraviolet light. The optical fiber receiving block 12 includes an upper surface 122, a lower surface 124, a front outer surface 126, and a rear outer surface 128, and defines two through holes 120 parallel to each other. The upper surface 122 is opposite to the lower surface 124. The front outer surface 126 is opposite to the rear outer surface 128. The front outer surface 126 is interconnected between the upper surface 122 and the lower surface 124. The rear outer surface 128 is interconnected between the upper surface 122 and the lower surface 124. The through hole 120 extends from the rear outer surface 128 to the front outer surface 126. The through hole 120 is located between the upper surface 122 and the lower surface 124, but is not exposed at each of the upper surface 122 and the lower surface 124. Each of the optical fibers 20 is received in a corresponding through hole 120 and retained by the wall of the corresponding through hole 120 alone, and does not protrude from the front outer surface 126. The through hole 120 of the optical fiber receiving block 12 can serve as a blind hole of the optical fiber connector 10 to receive the optical fiber 20. Therefore, when forming the optical fiber receiving block 12, two distal ends of a core pin for forming the through hole 120 can be secured and the core pin can resist the impact of the molding material during the injection molding process. This improves optical performance of the optical fiber connector 10.

The four lens portions 13 are formed on the front surface 113. Each lens portion 13 is aligned with a corresponding through hole 120, and optically coupled with a corresponding optical fiber 20 received in the through hole 120.

It is to be understood that in alternative embodiments, the number of the optical fiber receiving blocks 12, the receiving grooves 110, and the lens portions 13 can be different from the present embodiment and may depend on practical use.

When making the optical fiber connector 10, the optical fiber receiving blocks 12 and the body 11 with the lens portions 13 are formed by an injection-molding process. Then each optical fiber receiving block 12 is attached on the body 11 and entirely received in the corresponding receiving groove 110. In detail, the optical fiber receiving block 12 is inserted into the respective receiving groove 110, with the insertion direction of the optical fiber receiving block 12 being along a direction from the rear surface 114 to the front surface 113 or along a direction perpendicular to the top surface 111. The front outer surface 126 contacts the first inner side surface 116. The optical fibers 20 are extended into the respective through holes 120. It is to be understood that the optical fibers 20 may be extended into the through holes 120 before the optical fiber receiving blocks 12 are attached on the body 11.

The optical fiber receiving block 12 can be used as a reference standard piece to fit the body 11 of different shapes as long as the body 11 defines the receiving groove 110 to match the optical fiber receiving block 12. Therefore, time and cost for making the optical fiber connector 10 can be reduced.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector comprising:
   an optical fiber;

a body comprising a top surface, a bottom surface, a front surface, and a rear surface, the top surface and the bottom surface extending from the front surface to the rear surface, the body defining a receiving groove in the rear surface, the receiving groove being entirely exposed at the top surface and having an open end at the rear surface, the body including a lens portion arranged at the front surface; and an optical fiber receiving block attached on the body and entirely received in the receiving groove, the optical fiber receiving block comprising an upper surface, a lower surface opposite to the upper surface, a front outer surface, and a rear outer surface opposite to the front outer surface, the front outer surface and the rear outer surface interconnected between the upper surface and the lower surface, the optical fiber receiving block defining a through hole extending from the rear outer surface to the front outer surface, the through hole located between the upper surface and the lower surface, and being not exposed at each of the upper surface and the lower surface, the optical fiber received in the through hole and retained by the wall of the through hole alone, and not protruding from the front outer surface, the lens portion optically coupled with the optical fiber.

2. The optical fiber connector of claim 1, wherein a material of the body is different from a material of the optical fiber receiving block.

3. The optical fiber connector of claim 1, wherein the receiving groove is capable of allowing the optical fiber receiving block to be inserted into the receiving groove during assembly of the optical fiber connector along a direction from the rear surface to the from surface and allowing the optical fiber receiving block to be inserted into the receiving groove during assembly of the optical fiber connector along a direction perpendicular to the upper surface.

4. The optical fiber connector of claim 1, wherein the receiving groove consists of a bottom surface, a first inner side surface, a second inner side surface, a third inner side surface opposite to the second inner side surface, and the open end, with the first inner side surface, the second inner side surface, and the third inner side surface extending from the bottom surface, and the first inner side surface interconnected between the second inner side surface and the third inner side surface and facing the open end.

5. The optical fiber connector of claim 4, wherein the front outer surface contacts the first inner side surface.

6. An optical fiber connector comprising:
a plurality of optical fibers;
a body comprising a top surface, a bottom surface, a front surface, and a rear surface, the top surface and the bottom surface extending from the front surface to the rear surface, the body defining a plurality of receiving grooves in the rear surface, each of the receiving grooves being entirely exposed at the top surface and having an open end at the rear surface, the body including a plurality of lens portions arranged at the front surface; and a plurality of optical fiber receiving blocks each attached on the body and entirely received in a corresponding receiving groove, each of the optical fiber receiving blocks comprising an upper surface, a lower surface opposite to the upper surface, a front outer surface, and a rear outer surface opposite to the front outer surface, the front outer surface and the rear outer surface interconnected between the upper surface and the lower surface, each optical fiber receiving block defining a plurality of through holes extending from the rear outer surface to the front outer surface, each of the through holes located between the upper surface and the lower surface, and being not exposed at each of the upper surface and the lower surface, each of the optical fibers received in a corresponding through hole and retained by the wall of the corresponding through hole alone, and not protruding from the front outer surface, each lens portion optically coupled with the corresponding optical fiber.

7. The optical fiber connector of claim 6, wherein a material of the body is different from a material of the optical fiber receiving blocks.

8. The optical fiber connector of claim 6, wherein the receiving grooves are capable of allowing the optical fiber receiving blocks to be inserted into the corresponding receiving grooves during assembly of the optical fiber connector along a direction from the rear surface to the front surface and allowing the optical fiber receiving blocks to be inserted into the corresponding receiving grooves during assembly of the optical fiber connector along a direction perpendicular to the upper surface.

9. The optical fiber connector of claim 6, wherein each of the receiving grooves consists of a bottom surface, a first inner side surface, a second inner side surface, a third inner side surface opposite to the second inner side surface, and the open end, with the first inner side surface, the second inner side surface, and the third inner side surface extending from the bottom surface, and the first inner side surface interconnected between the second inner side surface and the third inner side surface and facing the open end.

10. The optical fiber connector of claim 9, wherein the front outer surface contacts the first inner side surface.

* * * * *